UNITED STATES PATENT OFFICE.

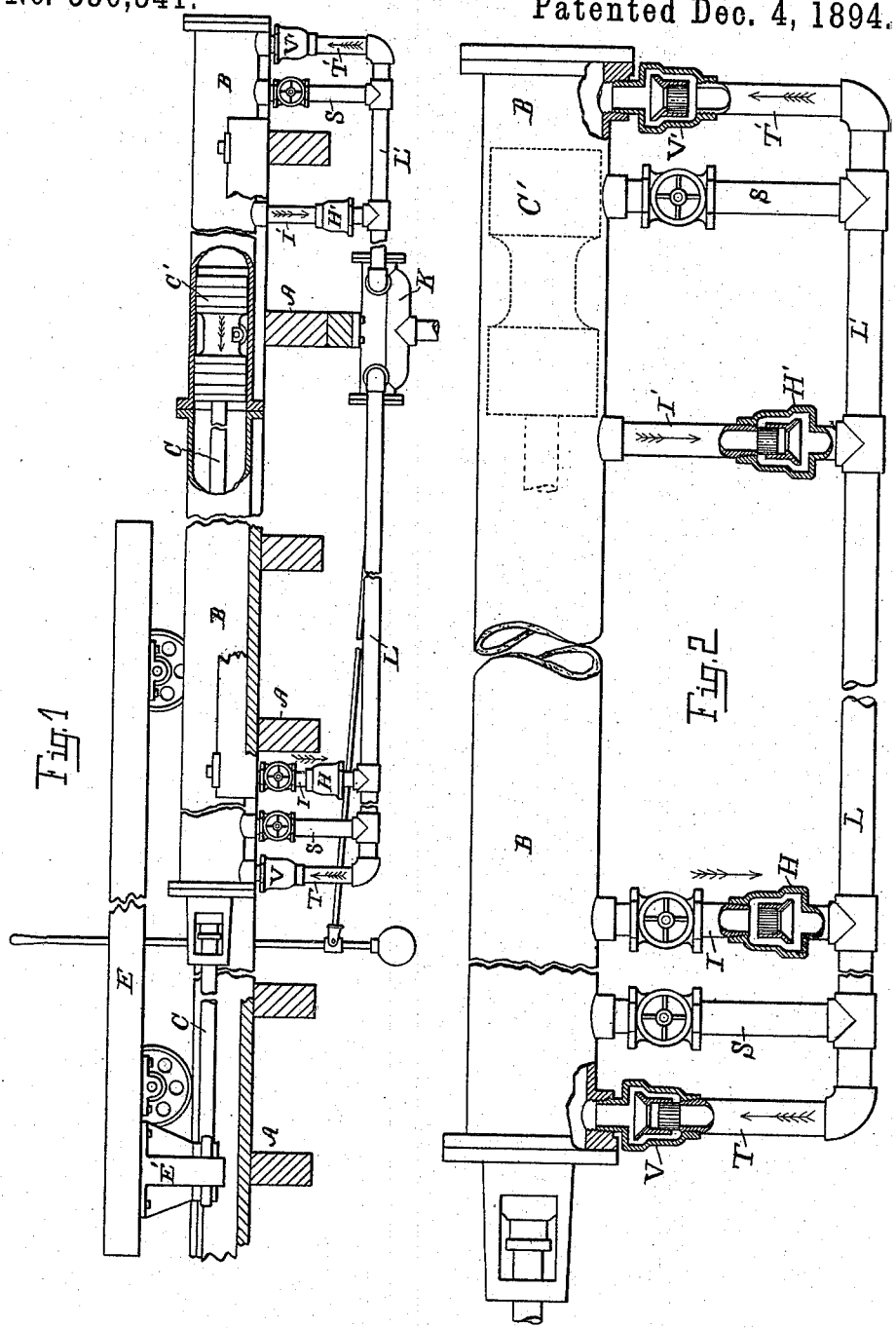

WILLIAM E. HILL, OF KALAMAZOO, MICHIGAN.

DIRECT-ACTING STEAM-ENGINE.

SPECIFICATION forming part of Letters Patent No. 530,341, dated December 4, 1894.

Application filed February 25, 1893. Serial No. 463,759. (No model.)

*To all whom it may concern:*

Be it known that I, WILLIAM E. HILL, a citizen of the United States, residing at the city of Kalamazoo, in the county of Kalamazoo and State of Michigan, have invented certain new and useful Improvements in Direct-Acting Steam-Engines, of which the following is a specification.

My invention relates to improvements in direct acting steam engines and more particularly to that class of direct acting steam engines which have very long steam cylinders and are used to reciprocate the log carriages of saw mills and for similar purposes.

The object of my invention is to provide a safety exhaust that will stop the action of the engine should the operator accidentally lose control or carelessly operate the engine. I accomplish these results by the mechanism shown in the accompanying drawings, in which—

Figure 1, shows a side view, in sections, of my improved engine as applied to a saw-mill carriage. Fig. 2 is a detail view of the two ends of the cylinder B with the pipes and valves attached, the check valves being shown in section and the position of the piston head being indicated by dotted lines.

Similar letters of reference refer to similar parts throughout the several views.

A, A, are the floor and floor timbers of a saw-mill.

B, is the cylinder of my improved engine which contains the piston head C' with the piston rod C projecting through a stuffing box and guide at the end of the cylinder.

The piston rod C is attached by the bracket E' to the carriage E which travels on a track in the usual manner.

At the ends of the steam cylinder B the inlet pipes T and T' open into the cylinder. The pipes contain each the check valves V and V' respectively. At a little distance from each end of the cylinder are the exhaust pipes S and S'.

It will be seen that a quantity of steam or air will be confined in each end of the cylinder whenever the piston head C' passes the exhaust pipes S or S' toward their respective ends of the cylinder B. At a distance a little greater than the length of the piston head C, from each end of the cylinder B, are located two other exhaust pipes I and I', one at each end. These exhaust pipes each contain a check valve H and H'. The exhaust and feed pipes at both ends of the cylinder being the same it will be noticed that steam can only pass the check valves when moving in the direction of the arrows.

The piston head C' is made very long so that an anti-friction roller r, can be placed on the under side. Of course two or more rollers could be used but one is sufficient. The piston rod C is firmly attached to the head C'.

When steam, (or any other fluid under pressure) is admitted by any suitable engine valve K to the pipe L' it passes up through the check valve V' and forces the piston head C' forward carrying by its connections the carriage E.

As the piston head C' passes along toward the foot of the cylinder steam exhausts through the pipes S' and I' until the piston passes over them. When the piston passes beyond the pipe S', as shown by the dotted lines in Fig. 2 it compresses the steam confined in the end of the cylinder which serves as a cushion to stop the force of the blow, and when the rear of the piston passes the port to the pipe I' the steam will exhaust and relieve the pressure back of the piston head and so leave only the momentum of the carriage and other parts to be overcome by the steam cushion in the end of the cylinder. Where there is no steam cushion in the cylinder of course the bumper overcomes the momentum.

When the valve K is operated to return the piston, steam passes through the pipe L to the pipe T past the check valve V at the front end of the cylinder in front of the piston head C' and carries the piston back, the check valve H preventing any steam entering the cylinder B back of the piston head. The piston itself prevents any steam entering through the pipe S till it has passed that point.

It is clear that cross pipes S S' can be omitted without materially changing my invention. The space at the end of the cylinder B containing confined steam or air would be larger in that case—that is air or steam would be compressed in the ends of cylinder B as soon as the piston head passes ports to cross pipes I and I' respectively.

I have an application in the Patent Office, filed February 25, 1893, Serial No. 463,758, for a similar invention to the one described in this specification, of which this invention is a species and that the genus.

Having thus described my invention, what I claim, and desire to secure by Letters Patent, is—

1. In a direct acting steam engine, an exhaust pipe containing a check valve opening into the steam cylinder more than the length of the piston head from the end of the cylinder in combination with an inlet pipe opening into the extreme end of the cylinder both being connected to the pipe that passes to the engine valve for the purpose specified.

2. In a direct acting steam engine a steam cylinder B containing the piston head C' with the piston rod C in combination with the inlet pipe T containing the check valve V the exhaust pipe S and the exhaust pipe I at a distance more than the length of the piston head from the end of the cylinder and the check valve H all connected with valve K by pipe L for the purpose specified.

3. In a direct acting steam engine, a steam cylinder B containing the piston head C' with the piston rod C passing through a stuffing box at the end in combination with the inlet pipe T containing the check valve V and the exhaust pipe I, containing the check valve H opening into the cylinder B at a point more than the length of the piston head from the end of the cylinder B both connected by pipe L to the engine valve K for the purpose specified.

4. In a direct acting steam engine a steam cylinder B, containing a piston head C' with a piston rod C passing through a stuffing box at the end, and having inlet pipes at the end in combination with exhaust pipes containing check valves more than the length of the piston head from each end both the inlet and outlet pipe at each end joining a single pipe which connects with the engine valve, for the purpose specified.

5. The combination in a direct acting steam engine of a piston head and a piston rod of an inlet pipe at the end of the cylinder and an outlet pipe more than the length of the piston head from the end of the cylinder and check valves in both the pipes for the purpose specified.

6. In a direct acting steam engine the combination with an inlet pipe at the end of the cylinder of an outlet pipe containing a check valve opening into the cylinder more than the length of the piston head from the end of the cylinder, both inlet and outlet pipe being connected by the same pipe to the engine valve, for the purpose specified.

In witness whereof I have hereunto set my hand and seal in the presence of two witnesses.

WILLIAM E. HILL. [L. S.]

Witnesses:
  E. S. ROOS,
  CORA WESTBROOK.